US012577980B2

(12) United States Patent
Ichinose

(10) Patent No.: US 12,577,980 B2
(45) Date of Patent: Mar. 17, 2026

(54) FLOATING JOINT AND ULTRASONIC VIBRATION JOINING APPARATUS

(71) Applicant: Toshiba Mitsubishi-Electric Industrial Systems Corporation, Tokyo (JP)

(72) Inventor: Akihiro Ichinose, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 968 days.

(21) Appl. No.: 17/610,708

(22) PCT Filed: Apr. 15, 2020

(86) PCT No.: PCT/JP2020/016507
§ 371 (c)(1),
(2) Date: Nov. 12, 2021

(87) PCT Pub. No.: WO2021/210083
PCT Pub. Date: Oct. 21, 2021

(65) Prior Publication Data
US 2022/0252102 A1      Aug. 11, 2022

(51) Int. Cl.
*F16C 11/06* (2006.01)
*B23K 20/10* (2006.01)

(52) U.S. Cl.
CPC .......... *F16C 11/0623* (2013.01); *B23K 20/10* (2013.01); *F16C 11/0647* (2013.01);
(Continued)

(58) Field of Classification Search
CPC ............... F16C 11/0647; B23K 20/106; Y10T 403/32819; Y10T 403/32827
See application file for complete search history.

(56) References Cited

U.S. PATENT DOCUMENTS 3,038,358 A * 6/1962 Jones .................... B23K 20/106
228/1.1
3,158,391 A * 11/1964 Carmi ..................... C03B 11/06
65/323
(Continued)

FOREIGN PATENT DOCUMENTS

DE      27 49 258      * 5/1978 ............... F16D 7/02
JP      63-106414 A     5/1988
(Continued)

OTHER PUBLICATIONS

Extended European Search Report dated Dec. 5, 2022, issued in European application No. 20931177.8.
(Continued)

*Primary Examiner* — Michael P Ferguson
(74) *Attorney, Agent, or Firm* — XSENSUS LLP

(57) ABSTRACT

A floating joint includes a driving side coupling portion and a driven side coupling portion serving as first and second connections. A pressure adjusting structure in the floating joint is provided between the bottom surface exposed region of the spherical portion for contact and the bottom surface facing region of a fixing ring without a gap, and has elasticity. Therefore, the floating joint relatively firmly maintains the one-side spherical contact relationship, in which the top region of the spherical portion for contact contacts a part of the bottom surface portion of the frame body by the elastic force of the pressure adjusting structure.

16 Claims, 8 Drawing Sheets

(52) U.S. Cl.
CPC ... *F16C 11/0685* (2013.01); *Y10T 403/32819* (2015.01); *Y10T 403/32827* (2015.01)

(56)                References Cited

U.S. PATENT DOCUMENTS

| | | | | |
|---|---|---|---|---|
| 3,670,630 | A | * | 6/1972 | Tyson ..................... F16B 21/16 |
| | | | | 403/135 |
| 4,160,626 | A | * | 7/1979 | Bell .................... F16C 11/0604 |
| | | | | 417/403 |
| 5,413,031 | A | * | 5/1995 | Kohlmeyer .......... B23Q 1/5462 |
| | | | | 92/140 |
| 6,336,803 | B1 | * | 1/2002 | Funger ................... B26D 7/086 |
| | | | | 156/580.2 |

FOREIGN PATENT DOCUMENTS

| | | | |
|---|---|---|---|
| JP | 4-80925 | U | 7/1992 |
| JP | 2000-320533 | A | 11/2000 |
| JP | 2001-99135 | A | 4/2001 |
| JP | 2001-129415 | A | 5/2001 |
| JP | 2007-32595 | A | 2/2007 |
| JP | 2010-276140 | A | 12/2010 |
| JP | 2012-89658 | A | 5/2012 |
| WO | 2016/121018 | A1 | 8/2016 |

OTHER PUBLICATIONS

Examination Report No. 1 dated Dec. 15, 2022 issued in Australian application No. 2020442534.

International Search Report and Written Opinion mailed on Jul. 7, 2020, received for PCT Application PCT/JP2020/016507, Filed on Apr. 15, 2020, 12 pages including English Translation.

International Preliminary Report on Patentability issued Oct. 13, 2022 in corresponding International Patent Application No. PCT/JP020/016507 (with English translation), 12 pages.

* cited by examiner

F I G.  1
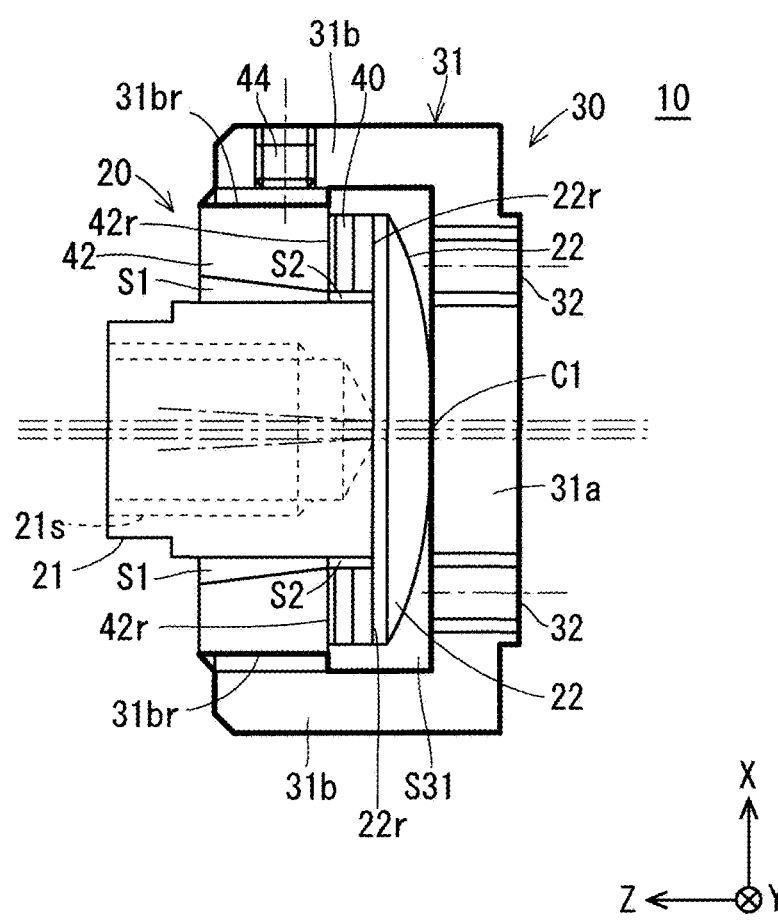

F I G.  2
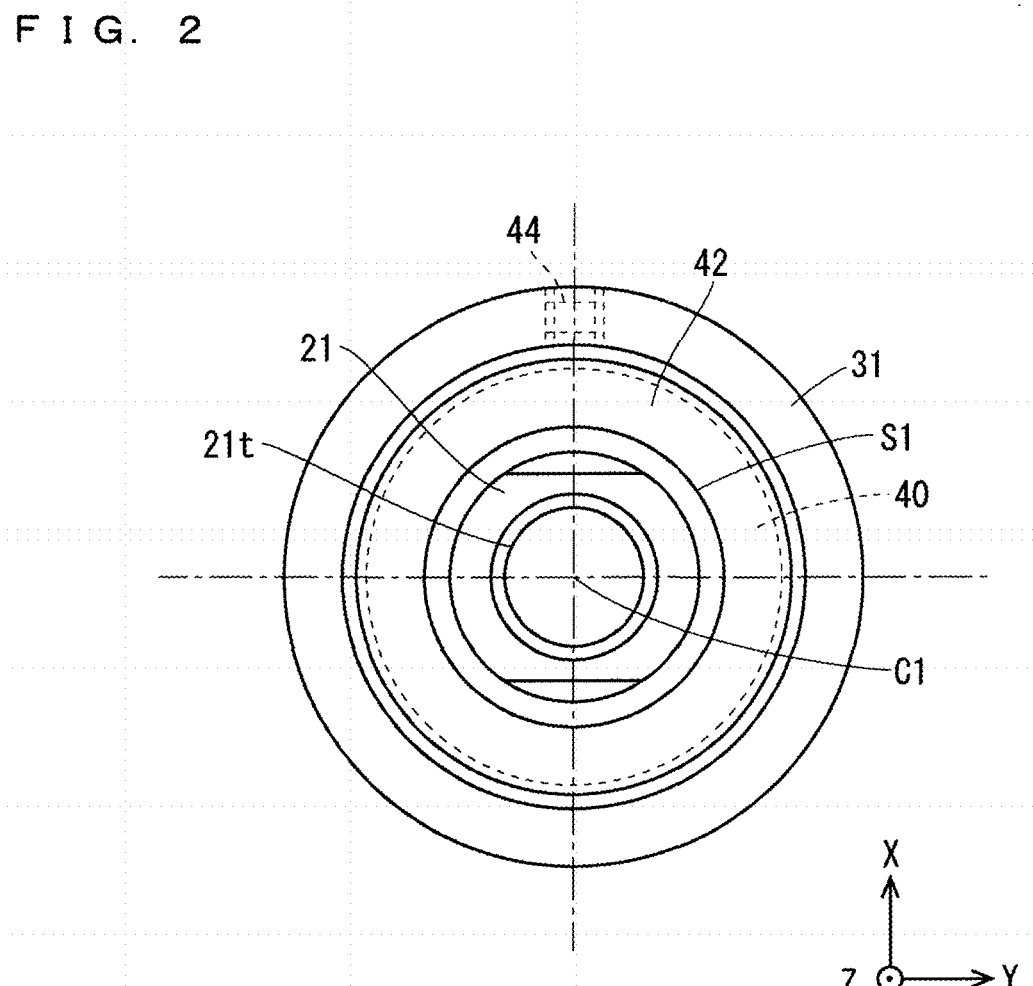

F I G. 3
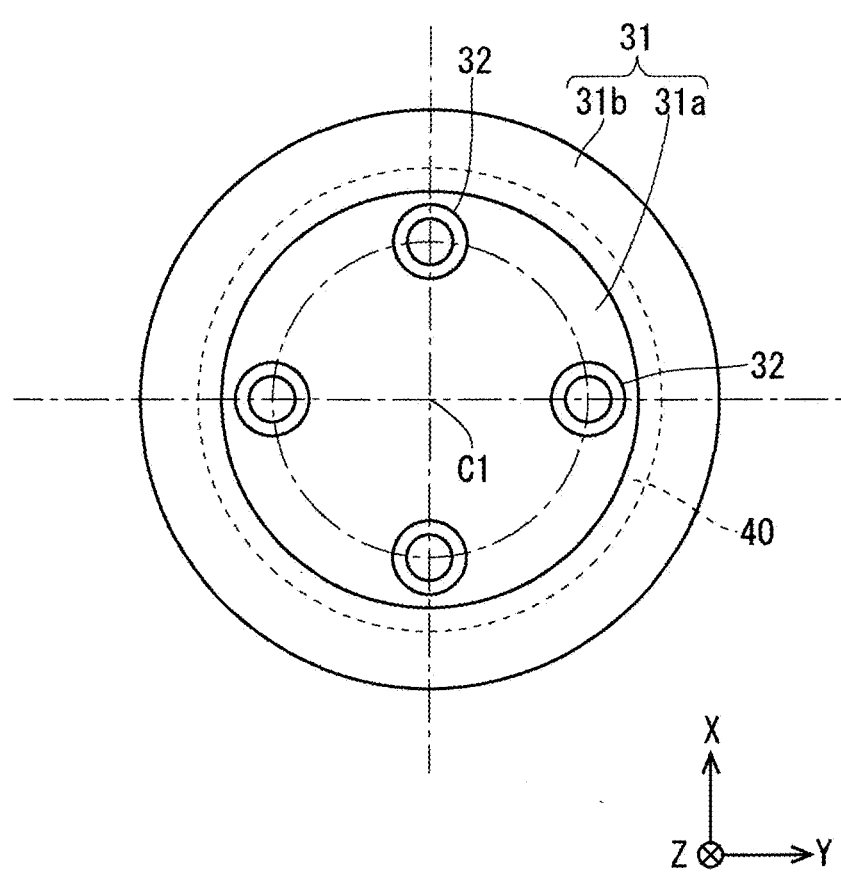

F I G. 4
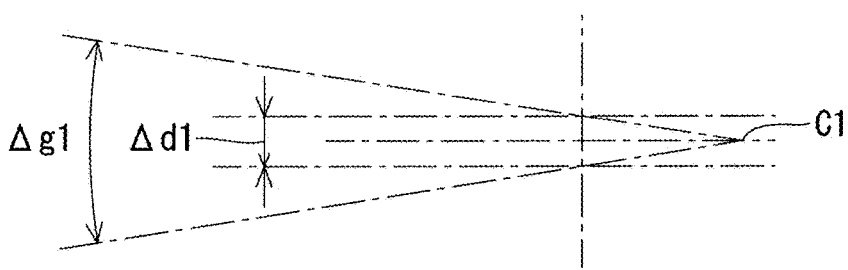
F I G. 5
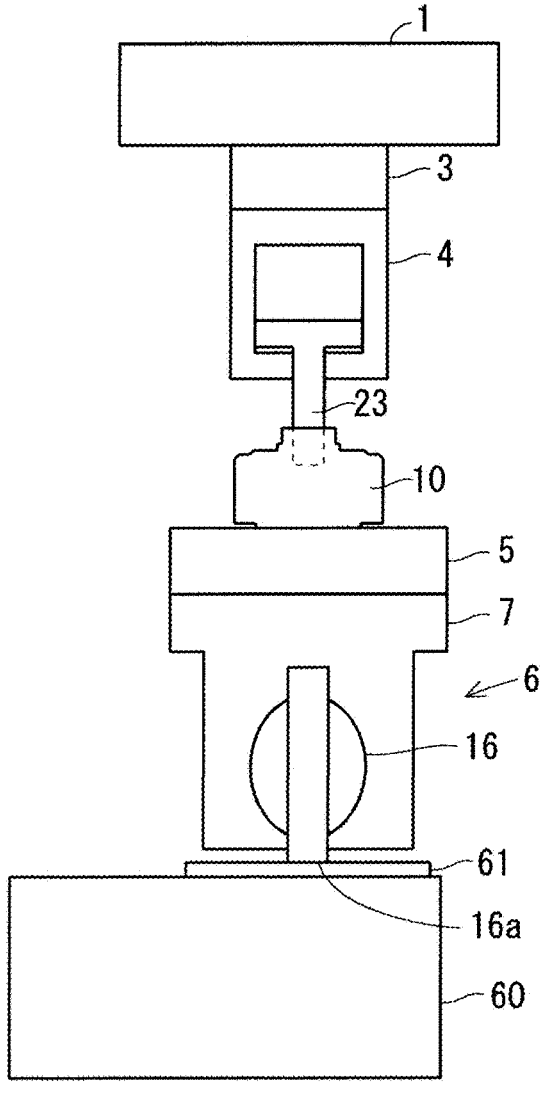

F I G.   7
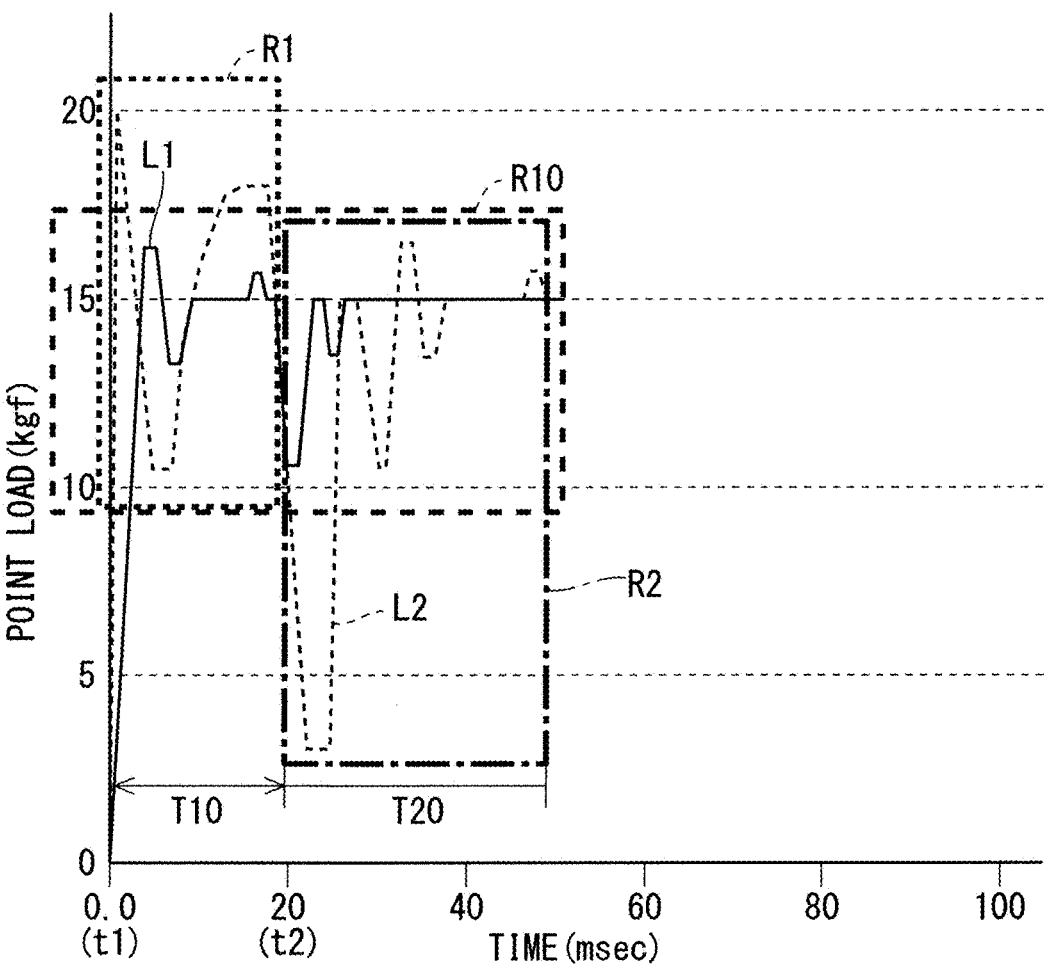

F I G .  8
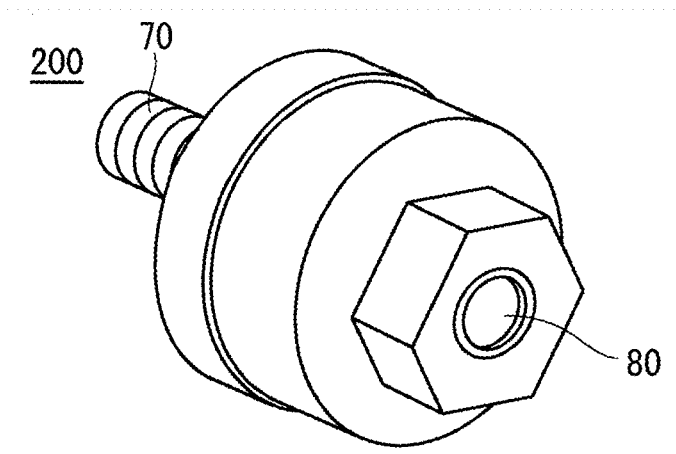
F I G .  9
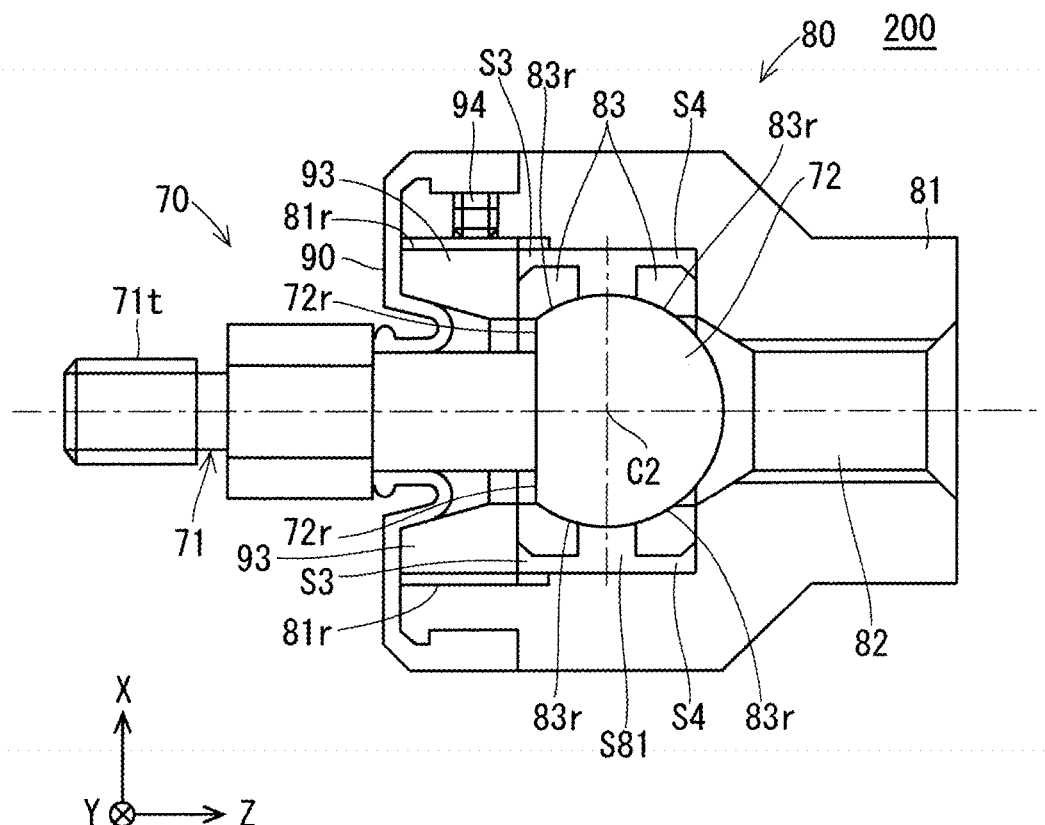

F I G.   1 0
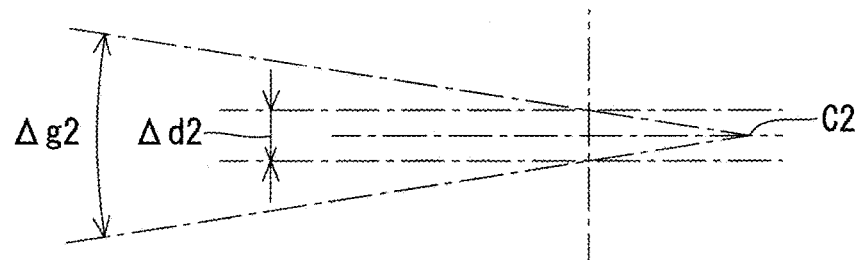

FLOATING JOINT AND ULTRASONIC VIBRATION JOINING APPARATUS

CROSS-REFERENCE TO RELATED APPLICATION

The present application is based on PCT filing PCT/JP2020/016507, filed Apr. 15, 2020, the entire contents of which are incorporated herein by reference.

TECHNICAL FIELD

The present disclosure relates to a floating joint in which a first connection and a second connection are coupled, and a pressure type ultrasonic vibration joining apparatus using the floating joint.

BACKGROUND ART

Conventionally, in the process of joining an electrode wire to a substrate after arranging the electrode wire for collecting current on the upper surface of the substrate for a thin-film solar cell, a pressure type ultrasonic vibration joining apparatus has been used to perform the ultrasonic vibration processing in which an ultrasonic wave is applied while applying pressure to the electrode wire arranged on the substrate. The substrate and the electrode wire described above serve the joining objects in the ultrasonic vibration processing.

A typical pressure type ultrasonic vibration joining apparatus includes an ultrasonic joining head portion that executes an ultrasonic vibration operation that applies ultrasonic vibration from an ultrasonic joining portion, a pressurizing mechanism that is coupled with the ultrasonic joining head portion and executes the pressurizing operation in which pressure is applied to the ultrasonic joining head portion toward a joining object.

And, a lifting frame that holds the ultrasonic joining head portion and the pressurizing mechanism are typically coupled via a floating joint. Patent Document 1 or Patent Document 2 discloses a conventional floating joint.

A conventional floating joint includes a first connection to which a first connection object is attached, a second connection to which a second connection object is attached, and the first connection and the second connection are relatively swingably coupled with each other.

Specifically, in the conventional floating joint, connection between the first and second connections is established while maintaining a bilateral spherical contact relationship in which a first spherical connection region provided in the first connection and a second spherical connecting region provided in the second connection are brought into contact with each other.

PRIOR ART DOCUMENTS

Patent Documents

[Patent Document 1] WO2016/121018
[Patent Document 2] Japanese Patent Application Laid-Open No. 2000-320533

SUMMARY

Problem to be Solved by the Invention

As described above, the conventional floating joint is fixed in the appropriate gaps between the first and second spherical connection regions in order to maintain a flexible bilateral spherical contact relationship between the first and second connections. The fixed gaps ensure that the first and second connection objects are not disturbed during actual operation with the floating joint.

Here, consider the case of the conventional floating joint in a pressure type ultrasonic vibration joining apparatus.

In the pressure type ultrasonic vibration joining apparatus, the pressurizing operation by the pressurizing mechanism and the ultrasonic vibration operation by the ultrasonic joining head portion are performed in parallel.

In the ultrasonic vibration joining apparatus with the conventional floating joint, there are aforementioned fixed gaps between the first and second spherical connection regions during the execution of the ultrasonic vibration operation. This causes the driven side (the joining head side) to bounce in the gap, resulting in a contact unstable state in which releasing and re-contacting in the contact state between the first and second spherical connection regions is temporarily repeated.

For this reason, the conventional ultrasonic vibration joining apparatus has had a malfunction where large fluctuations are caused in the pressure applied to the ultrasonic joining portion due to the above contact unstable state during the operating period of the ultrasonic vibration operation.

As a result, the conventional ultrasonic vibration joining apparatus has had a problem that the ultrasonic vibration operation and pressure control on the jointed objects cannot be accurately performed due to the above contact unstable state.

Thus, the conventional floating joint has had a problem of adversely affecting the operation of floating joint utilization device, such as an ultrasonic vibration joining apparatus, due to the above contact unstable state that occurs during use.

An object of the present disclosure is to solve the above problems and provide a floating joint having a structure that does not cause the above contact unstable state between the first and second connections during use.

Means to Solve the Problem

A floating joint of the present disclosure is a floating joint including a first connection and a second connection in which the first connection and the second connection are coupled with each other, in which the first connection includes a shaft body, and a spherical portion for contact whose bottom surface is coupled with a tip of the shaft body and whose surface has a spherical shape, the spherical portion for contact having a bottom surface exposed region being a part of the bottom surface of the spherical portion for contact protruding outward from an outer circumference of the tip of the shaft body, the second connection includes a frame body having a recessed space that receives the spherical portion for contact, the recessed space accommodating the spherical portion for contact, the frame body having a bottom surface portion having a flat plate shape serving as a bottom surface of the recessed space and a side surface portion serving as a side surface of the recessed space, the bottom surface having an one-side spherical contact relationship in which a part of a surface of the spherical portion for contact is in contact with a part of the bottom surface portion, and the side surface portion having a shaft body facing region facing the shaft body, the shaft body is configured such that a first connection object is attachable thereto and the frame body is configured such that a second connection object is attachable thereto, the floating joint further includes a fixing member coupled with the frame body in the shaft body facing region and having a bottom surface facing region facing the bottom surface exposed region; and a pressure adjusting member provided between the bottom surface exposed region of the spherical portion for contact and the bottom surface facing region of the fixing member without a gap, and having elasticity, a contact state in which the surface of the spherical portion for contact is in contact with the part of the bottom portion is maintained, by an elastic power of the pressure adjusting member, and the surface of the spherical portion for contact has no other contact relationship other than the one-side spherical contact relationship.

Effects of the Invention

The floating joint of the present disclosure has the features described above; therefore, the contact state between the surface of the spherical portion for contact and a part of a recess portion is constantly maintained during use by appropriately setting the elastic force of the pressure adjusting member.

Consequently, even if the floating joint of the present disclosure is used with the first connection object attached to the first connection and the second connection object attached to the second connection, no contact released state in which the contact state between the surface of the spherical portion for contact and a part of the recess portion is released. Therefore, in the floating joint of the present disclosure, the contact unstable state in which the contact released state and the contact state are repeated between the surface of the spherical portion for contact and the recess portion does not occur.

As a result, the floating joint of the disclosure securely solves the malfunction caused by the occurrence of the contact released state (contact unstable state) during use.

Furthermore, the bottom surface portion of the frame body can be formed to have a flat plate shape; therefore, further progress is made in simplification of the device configuration with the floating joint of the present disclosure than that with the conventional floating joint due to the elimination of necessity of the bottom surface portion to be formed in a spherical shape.

The explicit purpose, feature, phase, and advantage of the disclosure will be described in detail hereunder with attached drawings.

BRIEF DESCRIPTION OF DRAWINGS

FIG. 1 A cross-sectional view illustrating a detailed structure of a floating joint according to Embodiment 1.

FIG. 2 A side view of the floating joint illustrated in FIG. 1 as viewed from the left side of the drawing.

FIG. 3 A side view of the floating joint illustrated in FIG. 1 as viewed from the right side of the drawing.

FIG. 4 An explanatory diagram illustrating a movable range of the floating joint illustrated in FIGS. 1 to 3.

FIG. 5 An explanatory diagram schematically illustrating a front structure of an ultrasonic joining device according to Embodiment 2.

FIG. 7 A graph illustrating changes over time in point load when the ultrasonic joining device of Embodiment 2 is in use.

FIG. 8 An explanatory diagram illustrating a schematic configuration of a floating joint being a basic technique.

FIG. 9 A cross-sectional view illustrating a detailed structure of the floating joint illustrated in FIG. 8.

FIG. 10 An explanatory diagram illustrating a movable range of the floating joint illustrated in FIGS. 8 and 9.

DESCRIPTION OF EMBODIMENTS

<Basic Technique>

Figure 6:
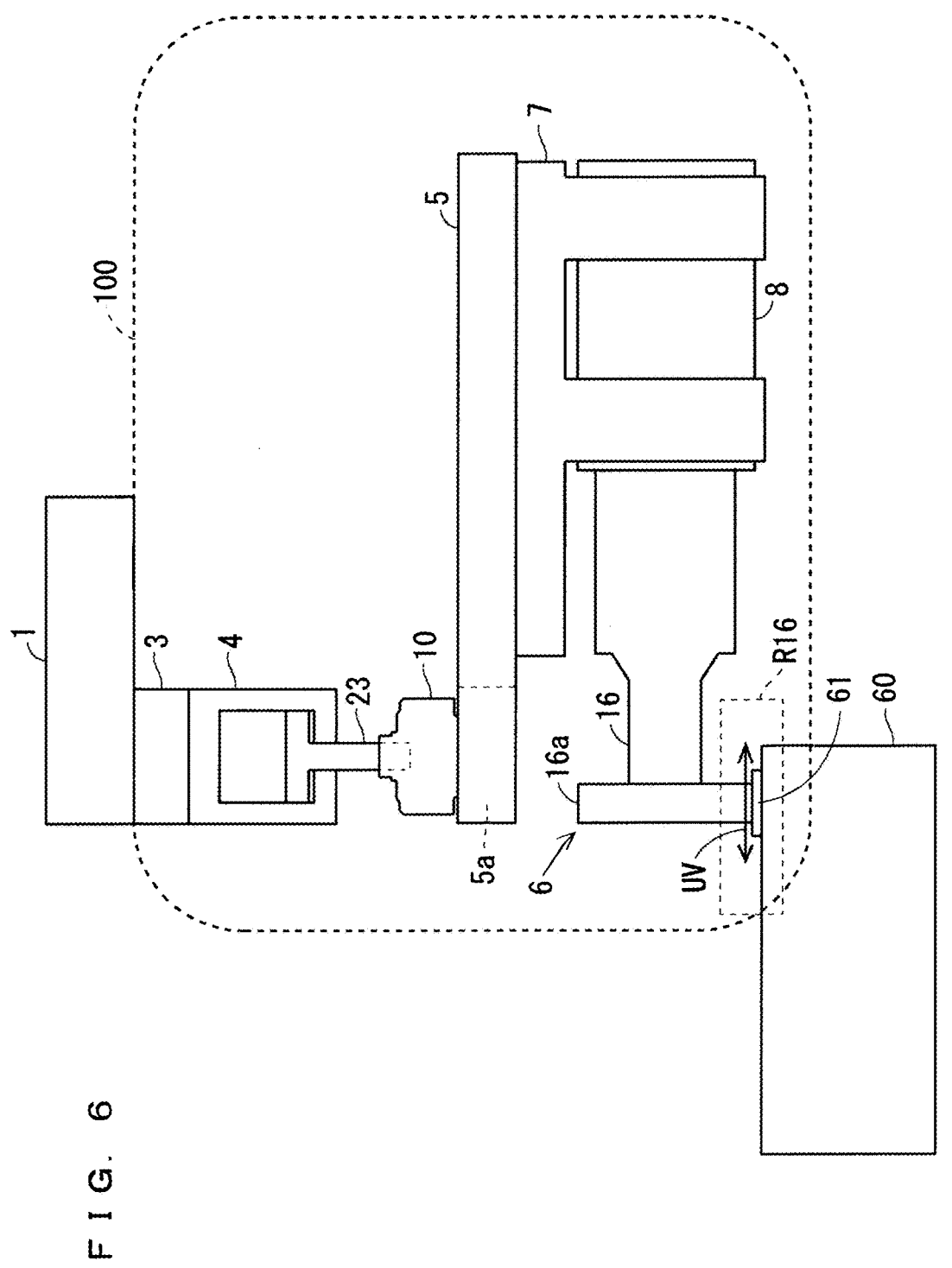
FIG. 6 An explanatory diagram schematically illustrating a side structure of the ultrasonic joining device illustrated in FIG. 5.

FIG. 8 is an explanatory diagram illustrating a schematic configuration of a floating joint 200 being a basic technique. As illustrated in FIG. 8, the floating joint 200 includes, as its main components, a driven side coupling portion 70 being a first connection, a driving side coupling portion 80 being a second connection, a protective cover 90, and a gap adjusting structure 93.

The floating joint 200 is formed by coupling the driven side coupling portion 70 and the driving side coupling portion 80 with each other.

The driven side coupling portion 70 is configured such that a driven side member being a first connection object is attachable thereto, and the driving side coupling portion 80 is configured such that a driving side member being a second connection object is attachable thereto.

FIG. 9 is a cross-sectional view illustrating a detailed structure of the floating joint 200 illustrated in FIG. 8. FIG. 9 illustrates an XYZ-rectangular coordinate system. As illustrated in FIG. 9, the driven side coupling portion 70 includes a shaft body 71 and a spherical portion for contact 72 as main components.

The shaft body 71 is formed in a cylindrical shape, and has a screw portion 71$t$ on one end portion side on the left side (−Z direction side) of FIG. 9. The driven side member can be screwed in the screw portion 71$t$ of the shaft body 71.

Meanwhile, in the shaft body 71, a spherical portion for contact 72 is formed at an other end portion thereof on the right side (+Z direction side) of FIG. 9. The shaft body 71 and the spherical portion for contact 72 are integrally formed in a manner that the bottom surface of the spherical portion for contact 72 contacts the other end portion of the shaft body 71. Further, the spherical portion for contact 72 has a bottom surface exposed region 72$r$ in which a part of the bottom surface protrudes radially outward from the outer circumference of the other end portion of the shaft body 71.

The driving side coupling portion 80 includes a frame body 81, a screw portion 82, and a spherical structural member for contact 83 as main components.

The frame body 81 has a recessed space S81 that accommodates most of the spherical portion for contact 72. Further, a screw portion 82 is provided in the frame body 81.

The spherical portion for contact 72 is accommodated in the recessed space S81 of the frame body 81 in such a manner that most of the spherical portion for contact 72 is included in the recessed space S81.

Two spherical structural members for contact 83 are formed in an annular shape in a plan view in the XY plane along the outer circumferences of the top side (+Z direction side from the center point C2) and the bottom side (−Z direction side from the center point C2) of the spherical portion for contact 72, respectively. In each of the two spherical structural members for contact 83, regions in contact with the surface of the spherical portion for contact 72 are spherical regions 83$r$. The surface of each of the two spherical regions 83$r$ has a surface shape that matches the spherical shape of the spherical portion for contact 72.

Therefore, the two spherical structural members for contact 83 hold the spherical portion for contact 72 in such a manner that the spherical regions 83r maintain a contact relationship with parts of the surface of the spherical portion for contact 72.

The frame body 81 has a shaft body facing region 81r facing the shaft body 71 on the inner peripheral surface thereof without contacting the spherical portion for contact 72, and the shaft body facing region 81r has an inner peripheral region having a female screw structure.

The gap adjusting structure 93 is formed in a cylindrical shape having a cavity inside, and the outer peripheral region of the side surface has a male screw structure. A part of the shaft body 71 exists in the cavity of the gap adjusting structure 93.

Then, by screwing between the outer peripheral region of the gap adjusting structure 93 and the inner peripheral region of the shaft body facing region 81r, the frame body 81 and the gap adjusting structure 93 are coupled with each other without using a separate mounting member.

Further, the protective cover 90 is provided from a part of the surface of the frame body 81 to the shaft body 71. The protective cover 90 is typically made of a rubber material, and has a structure in which, when covering with it as a cap, the cover per se is deformed and fixed at a groove formed on the outer circumference of the frame body 81.

Further, after the gap is adjusted by the gap adjusting structure 93, the gap adjusting structure 93 is coupled with the frame body 81 by a locking screw 94.

The floating joint 200 with such a structure maintains a contact relationship between a part of the top side surface of the spherical portion for contact 72 and the spherical region 83r of one of the spherical structural member for contact 83 (first spherical contact relationship), and maintains a contact relationship between a part of the bottom side surface of the spherical portion for contact 72 and the spherical region 83r of the other of the spherical structural member for contact 83 (second spherical contact relationship).

The first and second spherical contact relationships establish a bilateral spherical contact relationship in which the both are brought into contact in a spherical shape.

Accordingly, in the floating joint 200 of the basic technique, the driven side coupling portion 70 and the driving side coupling portion 80 are coupled with each other while maintaining the above-mentioned first and second spherical contact relationship with maintaining constant gaps, in the relationship with the spherical portion for contact 72.

FIG. 10 is an explanatory diagram illustrating a movable range of the floating joint 200. The center point C2 in FIG. 10 coincides with the center point C2 of the spherical portion for contact 72 illustrated in FIG. 9. As illustrated in FIG. 10, the movable range of the floating joint 200 is set with a movable distance Δd2 (center shift amount) and a movable angle Δg2 (inclination amount) as an allowable range. The movable distance Δd2 is considered to be about ±0.5 mm, and the movable angle Δg2 is considered to be about ±4 degrees (deg).

In the recessed space S81 formed by the frame body 81, gaps S3 and S4 are provided between the two spherical structural members for contact 83 and the frame body 81. Therefore, the spherical portion for contact 72 is allowed to move within the movable range illustrated in FIG. 10.

Accordingly, by coupling the driving side member and the driven side member with the floating joint 200, the power of the driving side member is transmitted to the driven side member. It should be noted that the transition of the rotation power of the driving side member to the driven side member by the floating joint 200 is not executable.

Here, consider a case where a virtual device in which a driving side member and a driven side member are coupled with each other with the floating joint 200. As described above, the gaps S3 and S4 are provided between the two spherical structural members for contact 83 and the frame body 81.

Therefore, the spherical portion for contact 72 moves within the above-mentioned movable range during the execution of the virtual device.

A first contact released state occurs by a gap generated between a part of the top side surface of the spherical portion for contact 72 and the spherical region 83r of the one of the spherical structural members for contact 83. A second contact released state occurs by a gap generated between a part of the bottom side surface of the spherical portion for contact 72 and the spherical region 83r of the other of the spherical structural members for contact 83.

A predetermined gap is formed between the respective spherical surfaces in the first and second contact relationships. Therefore, regarding the first contact relationship, the first contact unstable state occurs in which releasing and re-contacting in the contact state is temporarily repeated, and regarding the second contact relationship, the second contact unstable state occurs in which releasing and re-contacting in the contact state is temporarily repeated.

Therefore, various malfunctions occur due to the occurrence of the first and second contact unstable states during the operation of the virtual device. In particular, the shift amount in the axial direction (Z direction in FIG. 9) cannot be adjusted by the floating joint 200 per se. Here, the axial direction indicates a direction for connecting the first and second connection objects being coupling objects.

As described above, the virtual device using the conventional floating joint 200 has had a problem that the malfunctions caused by the occurrence of the first and second contact unstable states cannot be solved. Embodiments described below are intended to solve the above problems.

In the above-mentioned basic technique, although the first connection object to be coupled with the driven side coupling portion 70 of the floating joint 200 is dealt as a driven side member and the second connection object to be coupled with the driving side coupling portion 80 of the floating joint 200 is dealt as a driving side member, the reversed configuration may be adoptable.

That is, the first connection object to be coupled with the driven side coupling portion 70 of the floating joint 200 may be dealt as a driving side member and the second connection object to be coupled with the driving side coupling portion 80 of the floating joint 200 may be dealt as a driven side member.

Embodiment 1

FIG. 1 is a cross-sectional view illustrating a detailed structure of a floating joint 10 according to Embodiment 1 of the present disclosure. FIG. 2 is a side view of the floating joint 10 illustrated in FIG. 1 as viewed from the left side (+Z direction side) in the drawing, and FIG. 3 is a side view of the floating joint 10 illustrated in FIG. 1 as viewed from the right side (−Z direction side) in the drawing. An XYZ-rectangular coordinate system is illustrated in each of FIGS. 1 to 3.

As illustrated in FIGS. 1 to 3, the floating joint 10 includes, as its main components, a driving side coupling portion 20 being a first connection, a driven side coupling portion 30 being a second connection, a pressure adjusting structure 40, and a fixing ring 42.

The floating joint 10 is formed by coupling the driving side coupling portion 20 and the driven side coupling portion 30 with each other.

The driving side coupling portion 20 includes a shaft body 21 and a spherical portion for contact 22 as main components.

The shaft body 21 has a screwing space 21s in which the driving side member serving as the first connection object is screwed and fixed. A female screw structure is provided in at least a part of the inner peripheral region in the screwing space 21s. Therefore, the driving side member can be screwed in the screwing space 21s of the shaft body 21. At this point, provision of a male screw structure in at least a part of the outer peripheral region of the driving side member is required.

Meanwhile, in the shaft body 21, a spherical portion for contact 22 is coupled with an other end portion thereof on the right side (−Z direction side) of FIG. 1. That is, the shaft body 21 and the spherical portion for contact 22 are coupled with each other in a manner that the bottom surface of the spherical portion for contact 22 contacts the other end portion of the shaft body 21. The shaft body 21 and the spherical portion for contact 22 may be integrally configured. Further, the spherical portion for contact 22 has a bottom surface exposed region 22r being a part of the bottom surface of the spherical portion for contact 22 protrudes radially outward from the outer circumference of the other end portion of the shaft body 21.

The driven side coupling portion 30 includes a frame body 31 as a main component. The frame body 31 has a structure having a recessed space S31 for accommodating the spherical portion for contact 22 and the tip region of the shaft body 21.

That is, the frame body 31 is formed in a cylindrical shape having a bottom surface, and is structured with a disk-shaped bottom surface portion 31a (see FIG. 3) and a side surface portion 31b extending from the outer peripheral portion of the bottom surface portion 31a so as to surround the recessed space S31 and perpendicular to the bottom surface portion 31a.

As described above, the frame body 31 has the bottom surface portion 31a having a flat plate-shaped and serving as the bottom surface of the recessed space S31 and a side surface portion 31b serving as the side surface of the recessed space S31.

As illustrated in FIG. 3, the bottom surface portion 31a of the frame body 31 is provided with four screw holes 32 each of which extends through the bottom surface portion 31a at 90-degree intervals so as to be equidistant from the center point C1. Therefore, the driven side member is fixed to the frame body 31 by screwing and fixing the frame body 31 to the driven side member to be the second connection object with the four screw holes 32 provided in the bottom surface portion 31a.

The spherical portion for contact 22 is accommodated in the recessed space S31 in such a manner that the apex region including the apex of the spherical portion for contact 22 (the point corresponding to the center point C1) maintains a contact relationship with a part of the bottom surface portion 31a of the frame body 31.

The side surface portion 31b of the frame body 31 has a shaft body facing region 31br facing the shaft body 21 without contacting the spherical portion for contact 22, and the shaft body facing region 31br has an inner peripheral region having a female screw structure.

On the other hand, the fixing ring 42 serving as a fixing member is formed in a cylindrical shape, and the outer peripheral region being the side surface has a male screw structure. A part of the shaft body 21 exists in the cavity of the fixing ring 42.

Further, the fixing ring 42 has a bottom surface facing region 42r facing the bottom surface exposed region 22r of the spherical portion for contact 22 on the bottom surface (the surface on the −Z direction side).

Then, by screwing (first screwing) between the outer peripheral region of the fixing ring 42 and the inner peripheral region of the shaft body facing region 31br of the frame body 31, the frame body 31 and the fixing ring 42 are coupled with each other without using a separate mounting member.

When performing the first screwing, the fixing ring 42 moves in the −Z direction along the shaft body facing region 31br. Therefore, the position of the bottom surface facing region 42r in the Z direction becomes adjustable by the first screwing content. At the end of the first screwing, the position of the bottom facing region 42r is set. After the first screwing, the second screwing is performed.

That is, with a fixing screw 44 extending through the side surface portion 31b of the frame body 31, second screwing in which the side surface portion 31b of the frame body 31 and the fixing ring 42 are coupled with each other is performed, and this enables the frame body 31 and the fixing ring 42 to be firmly fixed with the bottom facing region 42r being positioned by the first screwing.

Accordingly, the frame body 31 and the fixing ring 42 are coupled with each other in a state where the bottom surface facing region 42r is positioned by the first and second screwing.

The pressure adjusting structure 40 being a pressure adjusting member, is provided between the bottom surface exposed region 22r of the spherical portion for contact 22 and the bottom surface facing region 42r of the fixing ring 42 without a gap, and has elasticity. For example, a spring is considered as the pressure adjusting structure 40.

The floating joint 10 of Embodiment 1 is characterized in that the one-side spherical contact relationship, in which the top region of the spherical portion for contact 22 contacts a part of the bottom surface portion 31a of the frame body 31, is maintained relatively firmly by the elastic force of the pressure adjusting structure 40.

In the floating joint 10 having such a structure, the contact relationship is maintained in which the top surface of the spherical portion for contact 22 contacts a part of the bottom surface portion 31a of the frame body 31. The contact relationship is a one-side spherical contact relationship as the surface of the spherical portion for contact 22 has a spherical shape and the bottom surface portion 31a has a flat plate shape.

Accordingly, in the floating joint 10, the driving side connecting portion 20 and the driven side connecting portion 30 are coupled with each other while maintaining the one-side spherical contact relationship between the top region of the spherical portion for contact 22 and the bottom surface portion 31a.

Accordingly, by coupling the driving side member and the driven side member with the floating joint 10, the power of the driving side member is transmitted to the driven side member.

FIG. 4 is an explanatory diagram illustrating a movable range of the floating joint 10. The center point C1 in FIG. 4 coincides with the apex position of the spherical portion for contact 22 illustrated in FIG. 1. As illustrated in FIG. 1, the movable range of the floating joint 10 is set with a movable distance Δd1 (center shift amount) and a movable angle Δg1 (inclination amount) as an allowable range. The movable distance Δd1 is considered to be about ±0.5 mm, and the movable angle Δg1 is considered to be about ±4 degrees (deg).

A gap S1 is provided between the fixing ring 42 and the shaft body 21, and a gap S2 is provided between the pressure adjusting structure 40 and the shaft body 21. Further, in the recessed space S31, a constant gap is provided between the side surface portion 31b and the spherical portion for contact 22 without contacting each other.

Therefore, the spherical portion for contact 22 of the floating joint 10 is allowed to move within the movable range illustrated in FIG. 4.

In the floating joint 10, the elastic force of the pressure adjusting structure 40 is set to a sufficiently large value so that the above-mentioned one-side spherical contact relationship is maintained even if the spherical portion for contact 22 moves within the above-mentioned movable range.

When the pressure adjustment structure 40 is a spring, as a method of increasing the elastic force of the pressure adjusting structure 40, a mode is conceivable in which the amount of contraction x of the spring is sufficiently increased by adjusting the spring constant k sufficiently, or adjusting an interval (tightening interval) between the bottom facing region 42r of the fixing ring 42 and the bottom surface exposed region 22r.

Therefore, when a spring having a constant spring constant k is used for the pressure adjusting structure 40, the elastic force of the pressure adjusting structure 40 can be variably set by adjusting the tightening interval described above.

The positioning of the bottom surface facing region 42r for setting the tightening interval can be performed by the above-mentioned first screwing.

Accordingly, by setting the elastic force of the pressure adjustment structure 40 sufficiently large, a relatively large force constantly acts in the direction of the spherical portion for contact 22 toward the bottom surface portion 31a; therefore, the contact released state in which the above-mentioned one-side spherical contact relationship is released does not occur while using the floating joint 10. Therefore, in the above one-side spherical contact relationship of the floating joint 10 of Embodiment 1, the contact unstable state in which the contact released state and the contact state are repeated does not occur.

That is, while the floating joint 10 is in use, the one-side spherical contact relationship between the top region of the spherical portion for contact 22 and the bottom surface portion 31a is constantly maintained.

Accordingly, the shift amount in the axial direction (Z direction in FIGS. 1 to 3) is not generated in the floating joint 10.

(Effect)

As described above, the floating joint 10 of Embedment 1 is provided between the bottom surface exposed region 22r of the spherical portion for contact 22 and the bottom surface facing region 42r of the fixing ring 42 being a fixing member without a gap, and includes the pressure adjusting structure 40 being a pressure adjusting member having elasticity.

And the floating joint 10 is characterized in that the one-side spherical contact relationship, in which the surface of the top region of the spherical portion for contact 22 contacts a part of the bottom surface portion 31a, is maintained by the elastic force of the pressure adjusting structure 40.

The floating joint 10 of Embodiment 1 has the above-described characteristics; therefore, by appropriately setting the elastic force of the pressure adjusting structure 40, the above one-side spherical contact relationship between the surface of the top region of the spherical portion for contact 22 and a part of the bottom surface portion 31a at the time of use is constantly maintained.

Here, assuming a floating joint utilization device using the floating joint 10 of Embodiment 1, in which a driving side member being a first connection object is attached to the driving side connection portion 20 and a driven side member being a second connection object is attached to the driven side connection portion 30.

The floating joint 10 of Embodiment 1 has the above-described characteristics; therefore, the contact released state in which the above one-side spherical contact relationship is released does not occur during the period of use of the floating joint utilization device. Therefore, in the above one-side spherical contact relationship of the floating joint 10 of Embodiment 1, the contact unstable state in which the contact released state and the contact state are repeated does not occur.

As a result, the floating joint 10 of Embodiment 1 securely solves the malfunctions caused by the occurrence of the contact released state (contact unstable state) during the use of the floating joint utilization device.

Further, the spherical portion for contact 22 and the bottom surface portion 31a have the above-described one-side spherical contact relationship, and the bottom surface portion 31a is formed in a flat plate shape and is not formed in a spherical shape.

As a result, the floating joint 10 of Embodiment 1 enables further progress in simplification in the device configuration than that by the conventional floating joint adopting the two-side spherical contact relationship.

Further, the side surface portion 31b of the frame body 31 serves as the same function as the protective cover 90 illustrated in FIG. 9; therefore, a component corresponding to the protective cover 90 is eliminated from the floating joint 10.

As described above, the floating joint 10 of Embodiment 1 enables progress in downsizing of the device due to the adoption of the one-side spherical contact relationship and elimination of a component corresponding to the protective cover 90.

Consequently, the floating joint 10 of Embodiment 1 enables the reduction in its size to about ¼ of the length of the conventional product in the Z direction which is the total length illustrated in FIGS. 1 to 3, as compared with the conventional product.

In addition, in the floating joint 10, in terms of the frame body 31 and the fixing ring 42, the first screwing between the outer peripheral region (male screw structure) of the fixing ring 42 and the inner peripheral region (female screw structure) of the shaft body facing region 31br of the frame body 31 fixes between the frame main body 31 and the fixing ring 42.

Therefore, the floating joint 10 can be positioned in the Z direction of the bottom surface facing region 42r by the first screwing described above.

Further, in addition to the first screwing described above, in terms of between the frame body 31 and the fixing ring 42, the second screwing using a fixing screw 44 extending through the side surface portion 31*b* fixes between the frame body 31 and the fixing ring 42.

Therefore, the floating joint 10 can firmly fix the frame body 31 and the fixing ring 42 in a state where the bottom surface facing region 42*r* is positioned.

In addition, the floating joint 10 can relatively easily fix the driving side member being the first connection object to the screwing space 21*s* provided inside the shaft body 21.

Further, in the floating joint 10, the driven side member of the frame body 31 is relatively easily fixed by screwing and fixing the frame body 31 and the driven side member being the second connection object with the use of four screw holes 32 (at least one of the screw holes) each extending through the bottom surface portion 31*a* of the frame body 31.

Therefore, shortening the assembling time to attach the first and the second connection objects to the floating joint 10 of Embodiment 1 is ensured.

Embodiment 2

FIG. 5 is an explanatory diagram schematically illustrating a front structure of an ultrasonic joining device 100 according to Embodiment 2 of the present disclosure. FIG. 6 is an explanatory diagram schematically illustrating a side structure of an ultrasonic joining device 100. FIGS. 5 and 6 are schematic views and the structure of each component and the connection mode between the components are illustrated in a simplified manner.

The ultrasonic vibration joining apparatus 100 includes, as its main components, a mechanical frame 1, a load cell 3, a pressure cylinder 4, the floating joint 10 of Embodiment 1, a lifting frame 5, a mounting jig 7, an ultrasonic joining head portion 6, and a table 60.

The driving side member includes the machine frame 1, the load cell 3, and the pressure cylinder 4, and the driven side member includes the lifting frame 5, the mounting jig 7, and the ultrasonic joining head portion 6.

As illustrated in FIGS. 5 and 6, the load cell 3 and the pressure cylinder 4 are attached to the machine frame 1. The load cell 3 measures the pressing force of the pressure cylinder 4.

Therefore, the machine frame 1, the load cell 3, and the pressure cylinder 4 compose the driving side member (first connection object) that moves as an integration of parts.

By screwing the tip end portion of a piston rod 23 of the pressure cylinder 4 in the screwing space 21*s* (see FIG. 1) of the floating joint 10, the driving side member including the piston rod 23 and the floating joint 10 are coupled with each other.

On the other hand, as illustrated in FIG. 6, the lifting frame 5 has a mounting region 5*a* for screwing. In the mounting region 5*a*, from the lower surface of the lifting frame 5 to its upper surface and through the four screw holes 32 (see FIGS. 1 and 3) provided on the bottom surface 31*a* are screwed with four external fixing screws (not illustrated).

As a result, the frame body 31 and the lifting frame 5 are coupled with each other so that the floating joint 10 and the driven side member (second connection object) including the lifting frame 5 are coupled with each other.

The mounting jig 7 is coupled to the lower surface of the lifting frame 5, and the converter 8 is mounted with the mounting jig 7. The converter 8 is integrated with the ultrasonic joining head portion 6, functions as a part of the ultrasonic joining head portion 6, and generates mechanical vibration to be transmitted to the ultrasonic joining head portion 6 based on an electric signal input from the outside.

Therefore, the lifting frame 5, the ultrasonic joining head portion 6 (including the converter 8), and the mounting jig 7 compose the driven side member (second connection object) that moves as an integration of parts.

The ultrasonic joining head portion 6 includes the converter 8 and an ultrasonic horn 16 as its main components, and the tip portion of the ultrasonic horn 16 is an ultrasonic joining portion 16*a*. An ultrasonic oscillator is built in the converter 8.

The ultrasonic joining head portion 6 is formed so as to extend in the head forming direction (leftward direction in FIG. 6) in the order of the converter 8 (ultrasonic oscillator) and the ultrasonic horn 16, and has the ultrasonic joining portion 16*a* at the tip end portion of the ultrasonic horn 16.

The ultrasonic joining head portion 6 causes the ultrasonic oscillator in the converter 8 to generate ultrasonic vibration UV, and executes an ultrasonic vibration operation in which, by transmitting the ultrasonic vibration UV to the ultrasonic joining portion 16*a* via the ultrasonic horn 16, the ultrasonic vibration is applied from the ultrasonic joining portion 16*a* to an application portion of the joining object.

As the joining object, for example, as illustrated in FIGS. 5 and 6, a solar cell panel 61 or the like placed on the table 60 can be considered. For example, a predetermined portion on the upper surface of an electrode arranged on a glass substrate constituting the solar cell panel 61 is the application portion for ultrasonic vibration. In this case, the ultrasonic vibration operation by the ultrasonic joining head portion 6 enables ultrasonic joining between the electrode and the glass substrate at the application portion of the electrode.

Further, the load cell 3 measures the pressing force by the piston rod 23 of the pressure cylinder 4. That is, the load cell 3 measures the point load (N), which is the pressing force of the tip end portion of the ultrasonic joining portion 16*a* pressing the solar cell panel 61.

As described above, the ultrasonic vibration joining apparatus 100 of Embodiment 2 includes the table 60, the ultrasonic joining head portion 6, the floating joint 10, and the pressure cylinder 4.

On the table 60, the solar cell panel 61 being a joining object is mounted.

The ultrasonic joining head portion 6 executes the ultrasonic vibration operation that applies ultrasonic vibration from the ultrasonic joining portion 16*a*.

The pressure cylinder 4 being a pressurizing mechanism, is coupled with the ultrasonic joining head portion 6 via the floating joint 10, the lifting frame 5, and the mounting jig 7, and executes pressurizing operation in which pressure is applied, toward the table 60 side, to the ultrasonic joining head portion 6.

In the ultrasonic vibration joining apparatus 100, the first connection object serves as a driving side member, and the second connection object serves as a driven side member.

As described above, the driving side member includes the machine frame 1, the load cell 3, and the pressure cylinder 4 (piston rod 23), and the driven side member includes the lifting frame 5, the ultrasonic joining head portion 6, and the mounting jig 7.

The tip end portion of the piston rod 23 of the pressure cylinder 4 is attached to the shaft body 21 of the driving side connecting portion 20, and the attachment region 5*a* of the lifting frame 5 is attached to the frame body 31.

Therefore, the driven side member including the ultrasonic joining head portion 6 moves following the expansion/contraction operation of the piston rod 23 of the pressure cylinder 4 in the driving side member.

FIG. 7 is a graph illustrating changes over time in point load when the ultrasonic vibration joining apparatus 100 of Embodiment 2 is in use. As described above, the point load indicates the force (N) at which the tip end portion of the ultrasonic joining portion 16a presses the solar cell panel 61.

In FIG. 7, load fluctuation L1 represents the load fluctuation with the ultrasonic vibration joining apparatus 100 of Embodiment 2 and load variation L2 represents the load variation with a conventional ultrasonic joining device that uses a conventional floating joint instead of the floating joint 10. Hereinafter, for convenience of explanation, the conventional floating joint will be referred to as the floating joint 200 illustrated in FIGS. 8 and 9.

Further, FIG. 7 illustrates a case where a point load of 147 N is set by the pressurizing operation of the pressure cylinder 4.

In FIG. 7, the pressurization start time t1 (time 0 (msec)) represents the time at which the tip end of the ultrasonic joining portion 16a starts contacting the surface of the solar cell panel 61. The pressurizing section T10 represents the period from the pressurization start time t1 to the joining start time t2 (time 20 (msec)), and the joining processing section T20 represents the predetermined period after the joining start time t2. In the pressurizing section T10, only the pressurizing operation by the pressure cylinder 4 is executed, and in the joining processing section T20, the pressurizing operation by the pressure cylinder 4 and the ultrasonic vibration operation by the ultrasonic joining head portion 6 are performed in parallel.

As the load fluctuation L2 of the load overshoot/undershoot range R1 in FIG. 7 shows, in the conventional ultrasonic vibration joining apparatus, an overshoot load exceeding the appropriate load range R10 is generated.

Regarding the floating joint 200 used in the conventional ultrasonic vibration joining apparatus, it is presumed that at least one of the first and second contact unstable states in the first and second spherical contact relationships occurs in the pressurizing section T10 from what the load fluctuation L2 in the load overshoot/undershoot range R1 shows.

On the other hand, in the ultrasonic vibration joining apparatus 100 of Embodiment 2, the whole load fluctuation L1 in the load overshoot/undershoot range R1 is present within the appropriate load range R10.

Regarding the floating joint 10 used in the ultrasonic vibration joining apparatus 100, it is presumed that the contact released state in which the one-side spherical contact relationship is released is not generated in the pressurizing section T10 from what the load fluctuation L1 shows in FIG. 7.

That is, it is presumed that the contact released state in which the one-side spherical contact relationship where the surface of the top region of the spherical portion for contact 22 and a part of the bottom surface portion 31a of the frame body 31 in the floating joint 10 is released is not generated in the pressurizing section T10.

As the load fluctuation L2 of the ultrasonic joining overshoot/undershoot range R2 in FIG. 7 shows, in the conventional ultrasonic vibration joining apparatus, an overshoot load below the appropriate load range R10 is generated.

Regarding the floating joint 200, it is presumed that at least one of the first and second contact unstable states in the first and second spherical contact relationships occurs in the joining processing section T20 from what the load fluctuation L2 in the ultrasonic joining overshoot/undershoot range R2 shows. Further, as a cause of the load fluctuation L2, the influence of the rigidity of the components of the floating joint 200 (spherical portion for contact 72, spherical structural member for contact 83 and the like) can be considered.

On the other hand, in the ultrasonic vibration joining apparatus 100 of Embodiment 2, the whole ultrasonic joining overshoot/undershoot range R2 is present within the appropriate load range R10.

From what the load fluctuation L1 shows in FIG. 7, it is presumed that no contact released state where the one side spherical contact relationship is released with respect to the floating joint 10, in the joining processing section T20.

The ultrasonic vibration operation is performed in a short period of time (tens of milliseconds); therefore, it is crucial to keep the tip load fluctuation small and within the appropriate load range R10.

As illustrated in FIG. 7, the ultrasonic vibration joining apparatus 100 of Embodiment 2 accurately executes the ultrasonic joining process by suppressing the fluctuation of the tip load in use and keeping it within the appropriate load range R10.

On the other hand, in the conventional ultrasonic vibration joining apparatus fails to control the fluctuations of the tip load in use, and the tip load fluctuates beyond the appropriate load range R10, which leads to inaccurate execution of the ultrasonic joining process.

Further, the load fluctuation L2 cannot be corrected in the conventional ultrasonic vibration joining apparatus; therefore, a weight control mechanism such as a counter balance weight or the like independent of the floating joint 200 is required to be provided in order to correct the load fluctuation L2.

It should be noted that, in order to securely avoid the occurrence of the contact released state with the floating joint 10 while using the ultrasonic vibration joining apparatus 100, it is desirable that the pressure adjusting structure 40 has an elastic force that is twice the weight of the driven side member being the second connection object.

Here, the weight of the driven side member indicates the total weight of the lifting frame 5, the mounting jig 7, and the ultrasonic joining head portion 6 (including the ultrasonic horn 16 and the converter 8).

Further, in order to securely avoid the occurrence of the contact released state with the floating joint 10 while using the ultrasonic vibration joining apparatus 100, it is desirable that the weight of the driven side member being the second connection object is 500 N or less.

(Effect)

The ultrasonic vibration joining apparatus 100 of Embodiment 2 uses the floating joint 10 of Embodiment 1 to couple the driving side member including the pressure cylinder 4 and the driven side member including the ultrasonic joining head portion 6 with each other.

In the floating joint 10 of Embodiment 1, no contact released state occurs in which the one-side spherical contact relationship between the surface of the top region of the spherical portion for contact 22 and a part of the bottom surface portion 31a is released during the use of the ultrasonic vibration joining apparatus 100. Therefore, in the above one-side spherical contact relationship of the floating joint 10 of Embodiment 1, the contact unstable state in which the contact released state and the contact state are repeated does not occur.

Therefore, fluctuations in the tip load applied to the tip of the ultrasonic joining portion 16a is more effectively suppressed than with the conventional ultrasonic vibration joining apparatus when the pressurizing operation by the pressure cylinder 4 being the pressurizing mechanism is executed during the execution period of the ultrasonic vibration operation by the ultrasonic vibration joining apparatus 100 of Embodiment 2.

As a result, the ultrasonic vibration joining apparatus 100 of Embodiment 2 accurately executes the ultrasonic joining process for the solar cell panel 61 serving as the joining object by executing the ultrasonic vibration operation by the ultrasonic joining head portion 6 while executing the pressurizing operation by the pressure cylinder 4.

The elastic force of the pressure adjusting structure 40 of the floating joint 10 used in the ultrasonic vibration joining apparatus 100 of Embodiment 2 is set to satisfy twice or more of the weight of the driven side member (the second connection object) including the ultrasonic joining head portion 6; therefore, reduction in the fluctuation of the tip load applied to the tip of the ultrasonic joining portion 16a is securely ensured.

The weight of the driven side member including the ultrasonic joining head portion used in the ultrasonic vibration joining apparatus 100 of Embodiment 2 is 500 N or less; therefore, stable reduction in the fluctuation of the tip load applied to the tip of the ultrasonic joining portion 16a is ensured.

<Others>

In above-described Embodiment, although the description has been made in which the first connection object to be coupled with the driving side connecting portion 20 of the floating joint 10 is dealt as the driving side member including the pressure cylinder 4, and the second connection object to be coupled with the driven side connecting portion 30 of the floating joint 10 is dealt as the driven side member including the ultrasonic joining head portion 6, the same effect is exhibited with the reversed configuration.

That is, the first connection object to be coupled with the driving side coupling portion 20 of the floating joint 10 may be dealt as the driven side member and the second connection object to be coupled with the driven side coupling portion 30 of the floating joint 200 may be dealt as the driving side member.

However, such a configuration requires to deal with some various changes such as providing a male screw structure in at least a part of the outer peripheral region of the driven side member and matching the form of the male screw structure with the screwing space 21s of the floating joint 10.

It should be noted that Embodiments can be arbitrarily combined and can be appropriately modified or omitted.

The invention claimed is:

1. A floating joint comprising a first connection and a second connection in which the first connection and the second connection are coupled with each other, wherein:
   said first connection includes:
   a shaft body, and
   a spherical portion for contact whose bottom surface is coupled with a tip of said shaft body and whose surface has a convex hemi-spherical shape coaxial with a longitudinal axis of the shaft body, said spherical portion for contact having a bottom surface exposed region being a part of the bottom surface of said spherical portion for contact protruding outward from an outer circumference of the tip of said shaft body,
   said second connection includes:
   a frame body having a recessed space that receives said spherical portion for contact, said recessed space accommodating the spherical portion for contact, said frame body having a bottom surface portion having a flat plate shape serving as a bottom surface of said recessed space and a side surface portion serving as a side surface of said recessed space, and said side surface portion having a shaft body facing region facing said shaft body,
said shaft body is configured such that a first connection object is attachable thereto by screwing and said frame body is configured such that a second connection object is attachable thereto by screwing,
said floating joint further comprises:
a fixing member coupled with said frame body in said shaft body facing region and having a bottom surface facing region facing said bottom surface exposed region; and
a pressure adjusting member provided between said bottom surface exposed region of said spherical portion for contact and said bottom surface facing region of said fixing member without a gap, and having elasticity,
a single-point spherical contact relationship in which only a center point defined at an apex of said convex hemi-spherical shaped surface of said spherical portion for contact is in contact with a part of the flat plate shape of said bottom surface portion of said frame body is maintained, by an elastic power of said pressure adjusting member, and
said spherical portion for contact has no other contact relationship with the flat plate shape of said bottom surface portion of said frame body other than said single-point spherical contact relationship by the center point of said spherical portion for contact.

2. The floating joint according to claim 1, wherein said fixing member has an outer peripheral region for a male screw structure, said shaft body facing region has an inner peripheral region for a female screw structure, and said frame body and said fixing member are fixed by first screwing between said outer peripheral region and said inner peripheral region.

3. The floating joint according to claim 2, wherein said frame body and said fixing member are fixed by second screwing with a fixing screw extending through said frame body.

4. The floating joint according to claim 3, wherein said shaft body of said first connection has a screwing space therein in which said first connection object is screwed and fixed.

5. The floating joint according to claim 3, wherein said bottom surface portion of said frame body in said second connection has at least one screw hole for attaching said second connection object.

6. An ultrasonic vibration joining apparatus comprising:
a table on which a joining object is placed;
an ultrasonic joining head portion that executes an ultrasonic vibration operation that applies ultrasonic vibration from an ultrasonic joining portion; and
a pressurizing mechanism that is coupled with said ultrasonic joining head portion via a floating joint and executes a pressurizing operation in which pressure is applied to said ultrasonic joining head portion toward said table, wherein:
said floating joint includes the floating joint according to claim 3,
said first connection object includes said pressurizing mechanism, and said first connection object is attached to said shaft body of said first connection, and
said second connection object includes said ultrasonic joining head portion, and said second connection object is attached to said frame body of said second connection.

7. The floating joint according to claim 2, wherein said shaft body of said first connection has a screwing space therein in which said first connection object is screwed and fixed.

8. The floating joint according to claim 2, wherein said bottom surface portion of said frame body in said second connection has at least one screw hole for attaching said second connection object.

9. An ultrasonic vibration joining apparatus comprising:

a table on which a joining object is placed;

an ultrasonic joining head portion that executes an ultrasonic vibration operation that applies ultrasonic vibration from an ultrasonic joining portion; and a pressurizing mechanism that is coupled with said ultrasonic joining head portion via a floating joint and executes a pressurizing operation in which pressure is applied to said ultrasonic joining head portion toward said table, wherein:

said floating joint includes the floating joint according to claim 2, said first connection object includes said pressurizing mechanism, and said first connection object is attached to said shaft body of said first connection, and said second connection object includes said ultrasonic joining head portion, and said second connection object is attached to said frame body of said second connection.

10. The floating joint according to claim 1, wherein said shaft body of said first connection has a screwing space therein in which said first connection object is screwed and fixed.

11. The floating joint according to claim 10, wherein said bottom surface portion of said frame body in said second connection has at least one screw hole for attaching said second connection object.

12. An ultrasonic vibration joining apparatus comprising:

a table on which a joining object is placed;

an ultrasonic joining head portion that executes an ultrasonic vibration operation that applies ultrasonic vibration from an ultrasonic joining portion; and a pressurizing mechanism that is coupled with said ultrasonic joining head portion via a floating joint and executes a pressurizing operation in which pressure is applied to said ultrasonic joining head portion toward said table, wherein:

said floating joint includes the floating joint according to claim 10, said first connection object includes said pressurizing mechanism, and said first connection object is attached to said shaft body of said first connection, and said second connection object includes said ultrasonic joining head portion, and said second connection object is attached to said frame body of said second connection.

13. The floating joint according to claim 1, wherein said bottom surface portion of said frame body in said second connection has at least one screw hole for attaching said second connection object.

14. An ultrasonic vibration joining apparatus comprising:

a table on which a joining object is placed;

an ultrasonic joining head portion that executes an ultrasonic vibration operation that applies ultrasonic vibration from an ultrasonic joining portion; and a pressurizing mechanism that is coupled with said ultrasonic joining head portion via a floating joint and executes a pressurizing operation in which pressure is applied to said ultrasonic joining head portion toward said table, wherein:

said floating joint includes the floating joint according to claim 1, said first connection object includes said pressurizing mechanism, and said first connection object is attached to said shaft body of said first connection, and said second connection object includes said ultrasonic joining head portion, and said second connection object is attached to said frame body of said second connection.

15. The ultrasonic vibration joining apparatus according to claim 14, wherein, in said floating joint, an elastic force of said pressure adjusting member is set to satisfy twice or more of a weight of said second connection object.

16. The ultrasonic vibration joining apparatus according to claim 15, wherein the weight of said ultrasonic joining head portion is 500 N or less.

\* \* \* \* \*